April 1, 1958  W. C. LARSEN  2,828,573
FISH HOOK
Filed Oct. 30, 1956
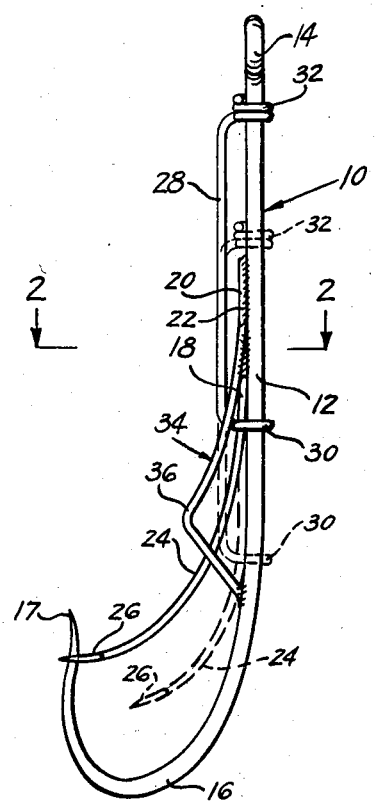
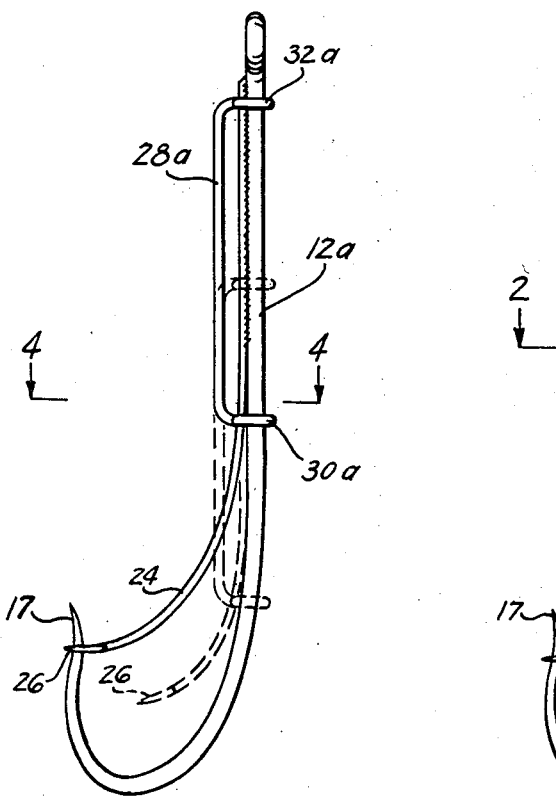
FIG. 3  FIG. 1
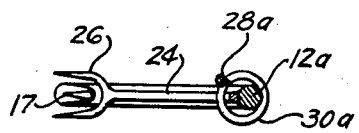  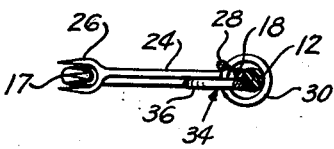
FIG. 4  FIG. 2
INVENTOR.
WILMER C. LARSEN
BY
McMorrow, Berman & Davidson
ATTORNEYS 2,828,573
Patented Apr. 1, 1958

2,828,573

FISH HOOK

Wilmer C. Larsen, Fairmont, Minn.

Application October 30, 1956, Serial No. 619,221

4 Claims. (Cl. 43—44.2)

This invention relates to improvements in fish hooks.

A primary object of the present invention is to eliminate the conventional barb on the pointed end of a fish hook, which barb is responsible for the tearing and injuring of undersized fish when they are removed from the hook and is the cause of injury to the person and clothing of a fisherman, and to substitute for the barb a retaining means, which possesses all of the desirable advantages of a barb, together with additional advantages, and which does not produce the undesirable and injurious effects.

Another important object of this invention is to provide a fish hook, which has a plain hook end, and which has a retaining arm that cooperates with the hook to hold the bait thereon and prevent the bait from being dislodged from the hook, as a result of a fish nibbling the bait, and which can be easily and safely removed from fish, without tearing the fish.

Another important object of this invention is to provide a fish hook which has a resilient retaining arm that cooperates with the hook to retain live bait on the hook, without damage to the bait and which permits the hook to be safely and easily removed from clothing, if it becomes accidentally attached thereto.

A further important object of this invention is to provide a fish hook, which includes a shank portion having a hook at one end and a resilient retaining arm which is carried by the shank portion and has a curved free end portion extending towards the hook and terminating in a fork-shaped free end which straddles the hook at the pointed end thereof.

Another object of this invention is to provide means for flexing the resilient curved portion of the retaining arm away from the hook, so as to move the fork-shaped end out of straddling relation with the hook in removing the hook from a fish or in removing the hook from clothing or the like.

A still further important object of the present invention is to provide an inexpensive, compact and durable fish hook, which can be easily and inexpensively manufactured.

The foregoing and ancillary objects are attained by this invention, the preferred embodiments of which are set forth in the following description and illustrated in the accompanying drawings, wherein:

Figure 1 is a side elevational view of a fish hook, constructed in accordance with the principles of the present invention;

Figure 2 is a cross-sectional view taken on line 2—2 of Figure 1;

Figure 3 is a side elevational view of the fish hook, showing the same without the guard means for the retaining arm, as provided in the form of Figure 1, and, Figure 4 is a cross-sectional view taken on line 4—4 of Figure 3.

Referring now more particularly to the accompanying drawings, and initially to Figures 1 and 2, the fish hook 10 includes a straight shank portion 12, which has an eye 14 formed integrally on one end for attaching the hook to a fishing line. The opposite end of the shank portion is formed with a hook 16, which terminates in a free pointed end 17. It is to be noted that the hook is plain and is not provided with any conventional barbs or the like.

A resilient retaining arm 18 is provided and includes a straight stem portion 20, which is suitably secured to the shank portion in side by side, intimate relationship therewith. Preferably, the stem portion is soldered or welded, as at 22, to the shank portion 12. The retaining arm 18, which is formed from inherently resilient material, is provided with a curved free end portion 24, that extends from the shank portion 12 outwardly towards the free end of the hook. The curved portion 24 terminates in a bifurcated or fork-shaped free end 26, which straddles the hook at the pointed end 18, as shown in Figure 1.

Means is provided for flexing or moving the curved end portion 24 away from the hook and into the release position, as shown in dotted lines in Figure 1. Such means preferably includes a rod 28, which is disposed parallel with the shank portion 12 and is provided at its opposing ends with loops 30 and 32, that project laterally from the rod and are preferably formed integral therewith. For example, the ends of the rod can be bent laterally and formed into loops. The loops are slidably circumposed on the shank portion, so that upon downward movement of the rod towards the hook, the lowermost loop 30 will cam over the curved portion 24 and move it inwardly, into the dotted line position of Figure 1.

A guard means 34 is provided for the retaining arm to prevent the curved portion 24 from being accidentally moved away from the hook by the bite of a fish on the hook and bait carried thereby. The guard means 34 includes a substantially V-shaped rod element 36, which has its opposing ends suitably secured, as by welding or soldering, to the shank portion. The apex of the rod element is spaced away from the shank portion and faces towards the hook and is positioned above the pointed end 17 of the hook.

To position bait, such as a live minnow, on the hook, the rod 28 is moved downwardly, so that the loop or ring 30 moves the free end portion 24 of the retaining arm away from the hook. The bait is then passed over the pointed end of the hook onto the hook and the rod element is moved upwardly to permit the curved end portion 24 to flex backwardly into its normal position, as shown in full lines in Figure 1. The bait will then be locked on the hook. To remove the hook from the mouth of a fish or, from clothing, if it accidentally becomes attached thereto, the rod is moved downwardly to move the curved end portion 24 away from the hook and into the dotted line position. The curved end portion will normally be in the position, as shown in full lines in Figure 1.

A modified form of the fish hook is shown in Figures 3 and 4, wherein the guard 34 is eliminated and the releasing rod 28a is formed at its upper and lower ends with integral eyes 30a and 32a, that extend laterally from the straight portion and are slidably circumposed on the shank portion 12a. In other respects, the fish hook of Figures 3 and 4 is identical in construction and operation to that of the fish hook shown in Figures 1 and 2.

While the preferred forms of this invention have been illustrated and described herein, other forms may be realized as come within the scope of the appended claims.

What is claimed is:

1. A fish hook comprising a shank portion having a line attaching means at one end and a hook at the other end, said hook having a pointed free end, a retaining arm connected to the shank portion in side by side relation and having a free end portion extending toward the hook, said free end portion having a fork-shaped free end straddling the hook at the pointed end thereof and means slidably disposed on the shank portion intermediate the line attaching means at the one end and the hook at the other end for moving the retaining arm away from the hook to move the fork-shaped end out of straddling relation with the hook.

2. A fish hook comprising a shank portion having a line attaching means at one end and a hook at the other end, said hook having a pointed free end, a resilient retaining arm connected to the shank portion in side by side relation and having a curved free end portion extending from the shank portion toward the hook and terminating in a free end normally straddling the hook adjacent the pointed end thereof, and means slidably disposed on the shank portion intermediate the line attaching means at the one end and the hook at the other end and movable axially thereof to engage the inner end of the curved free portion and flex the curved free portion away from the hook and move the fork-shaped end out of straddling engagement of the hook.

3. A fish hook as claimed in claim 3, wherein said means includes a slide member paralleling the shank portion and having opposing ends provided with laterally extending loops slidably circumposed on the shank portion, one of said loops being of a diameter to slide over the retaining arm and flex the free end portion toward the shank portion.

4. A fish hook comprising a shank portion having a line attaching means at one end and a hook at the other end, a flexible retaining arm having a straight portion and a curved free end portion, means attaching the straight portion to the shank portion in side by side relation therewith so that the curved end portion extends toward the hook, said curved end portion terminating in a free fork end straddling the hook, a slide member parallel with the shank portion and having opposing ends provided with laterally extending loops slidably circumposed on the shank portion intermediate the line attaching means at the one end and the hook at the other end, one of said loops being of a diameter to slide over the retaining arm and flex the free end portion towards the shank portion, and a guard means outstanding from the shank portion and projecting from the shank portion toward the hook above the curved free end portion.

References Cited in the file of this patent

UNITED STATES PATENTS

| | | |
|---|---|---|
| 713,306 | Jacoby | Nov. 11, 1902 |
| 2,078,162 | Robins | Apr. 20, 1937 |
| 2,176,820 | McConnell | Oct. 17, 1939 |
| 2,572,535 | Tackett | Oct. 23, 1951 |